US006126757A

United States Patent [19]

Kinnaird

[11] Patent Number: 6,126,757

[45] Date of Patent: Oct. 3, 2000

[54] METHOD OF RELEASING ASPHALT FROM EQUIPMENT USING SURFACTANT SOLUTIONS

[75] Inventor: Michael Gates Kinnaird, Durham, N.C.

[73] Assignee: Chemtek, Inc., Yanceyville, N.C.

[21] Appl. No.: 09/039,908

[22] Filed: Mar. 16, 1998

[51] Int. Cl.[7] .............................. B08B 7/04; C09D 5/20; C11D 17/00; C11D 3/00; C11D 9/00

[52] U.S. Cl. .............................. 134/37; 106/2; 510/366; 510/313; 510/501; 510/502

[58] Field of Search .............................. 134/37; 106/2; 510/366, 313, 501, 502

[56] References Cited

U.S. PATENT DOCUMENTS

| | | | |
|---|---|---|---|
| 2,085,706 | 6/1937 | Schoeller et al. | 510/502 |
| 2,183,561 | 12/1939 | Hamblin | 261/76 |
| 2,684,949 | 7/1954 | McMillan | 252/314 |
| 3,074,697 | 1/1963 | Friedell | 261/16 |
| 3,188,055 | 6/1965 | Lutjens et al. | 259/4 |
| 3,639,283 | 2/1972 | Crotty | 510/502 |
| 3,853,784 | 12/1974 | Rogers | 137/889 |
| 4,702,858 | 10/1987 | Denzinger et al. | 510/318 |
| 4,859,245 | 8/1989 | Schilling et al. | 106/277 |
| 5,085,278 | 2/1992 | Keltner | 169/15 |
| 5,139,706 | 8/1992 | Speranza et al. | 510/447 |
| 5,266,123 | 11/1993 | Brand | 134/26 |
| 5,494,502 | 2/1996 | DeLong | 106/2 |
| 5,510,051 | 4/1996 | Lam | 252/135 |
| 5,678,592 | 10/1997 | Boticki et al. | 137/216 |
| 5,750,748 | 5/1998 | Boutique et al. | 554/66 |
| 5,789,372 | 8/1998 | Fabry | 510/502 |
| 5,846,499 | 12/1998 | Laughlin et al. | 422/264 |
| 5,888,279 | 3/1999 | Salmonsen et al. | 106/2 |

OTHER PUBLICATIONS

"Non–Butyl Cleaners"—Author Unknown, Source: Exxon Chemical Company, dated Dec. 3, 1980.

Bulletin No. 125 "Veegum Formulary"—Author Unknown, Source: R.T. Vanderbilt Company, Inc. p. 21.

"Technical Information Shower Mate (Analysis Summary)"—Author Unknown, Source: Cyclo Chemicals Corp., No page No.

*Primary Examiner*—Frankie L. Stinson
*Assistant Examiner*—Yolanda E. Wilkins

[57] ABSTRACT

A method of preventing asphalt and tar from sticking to paving equipment comprises diluting a concentrate with about four to about 50 parts water to one part concentrate and spraying, rolling or brushing the diluted concentrate on the equipment, coating the dilution on equipment prior to its coming into contact with tar or asphalt. The concentrate comprises a fatty acid amide or mixture of fatty acid amides, a fatty acid neutralized with an excess of an alkyl- or alkanol- or mixed-type amine or ammonia, and an optional solvent or solvents. The chief advantages of the instant invention are that the dilutions are viscous, and so prevent the diluted material from running off of the equipment prior to contact with tar or asphalt, and that the diluted material leaves a lubricious film on the surface even after all the water in the diluted film has evaporated.

20 Claims, No Drawings

METHOD OF RELEASING ASPHALT FROM EQUIPMENT USING SURFACTANT SOLUTIONS

BACKGROUND OF THE INVENTION

1. Field of the Invention

This invention relates to a method of preventing tars and asphalts and related materials from sticking to paving equipment. The method comprises 1) coating a paving equipment surface by spraying, rolling or brushing with a release agent, 2) adding or contacting asphalt, tar or related material to the equipment or otherwise handling or using the asphalt with the sprayed equipment, and 3) if transportation or movement of the asphalt or tar is the desired purpose of utilizing the paving equipment, separating the asphalt from the equipment by releasing it at its point of intended use or 4) otherwise releasing the asphalt or tar or related material from the paving equipment. The particular release agents envisioned by this invention comprise a concentrate which can be diluted, the concentrate comprising a fatty acid amide or mixture of fatty acid amides, a fatty acid neutralized with diethanolamine or another alkyl- or alkanolamine or amines, and an optional solvent or solvents.

2. Prior Art

It is well-known in the industry that asphalt tar and related materials, used in their molten or liquid state, have a strong tendency to adhere to surfaces of the equipment used to handle, transport and otherwise use them. This buildup can be severe, rendering the equipment completely unsuitable for its purpose.

One traditional way to address this problem has been to spray the equipment with diesel fuel, which forms a lubricating layer in between the asphalt and the equipment. However, for regulatory reasons, this has become an obsolete method.

One response to the regulatory pressure to stop using diesel fuel has been to use other, less environmentally-unacceptable alternative solvents. An example of this type is "004", a citrus-based solvent sold by the Pure Corporation. It is used to clean paving equipment and to prevent tar or asphalt from sticking to the equipment in the first place. This type of solvent suffers from several drawbacks, at least one of which is the increased cost compared to diesel fuel.

Another drawback is that frequently the solvents chosen have a detrimental effect on the asphalt or tar in its final location, leading to a decreased strength of the resultant surface. For this reason, most such solvents can not be approved by state departments of transportation (DOT) for use as truckbed release agents, and so cannot be used on truckbeds that are carrying asphalt to pave on state roads.

Typically, the tests are rather severe, allowing contact between asphalt and solvent for 24 hours, and determining if there is any discoloration whatsoever in the solvent mixture. Most solvents used for release agents are unable to pass such a test.

Another response has been to utilize water-dilutable formulations. The solvent in this situation is water, which is cheap and plentiful, and known to repel asphalt. However, these materials suffer from serious drawbacks, leading to a reputation in the industry that they are ineffective.

The major drawback is that the water film is insufficiently persistent. This is caused primarily by the fact that the viscosity of water and many water solutions is very low, leading to the film rapidly draining off of the equipment, rendering it unprotected once again. The other drawback is that the water tends to evaporate, and the materials currently on the market are sufficiently poorly formulated that their is no residual film after the water dries.

U.S. Pat. No. 5,407,490 (Zofchak) discloses a method for releasing blacktop or other sticky materials from a truck bed, utilizing a concentrate comprising alkyl esters and surfactants. The concentrate is diluted in a ratio of about 20–30 to one with water, and applied to truck beds.

Since the method involves use of a solvent, namely alkyl esters, and dilution with water prior to application, it is essentially a combination of the two responses outlined above. It uses a solvent, but dilutes the concentrated solvent mixture with water prior to applying.

However, most solvent mixtures suffer from the drawbacks mentioned above, and so most state DOTs would likely not approve of the use of such a mixture. Therefore, a method of utilizing water as a diluent that does not utilize solvents that attack asphalt is desired.

Similarly, Vitech SOR, a synthetic hydrocarbon, is offered by Vitech International as a formulation component for an asphalt release agent. It is typically formulated with a small amount of a surfactant to render it emulsifiable, and diluted with water at a ratio of 1 part concentrate with 10 to 30 parts water.

This material is also a combination method, employing a solvent, an emulsifier system and water. Therefore, it will also likely not be approved by State DOTs.

SUMMARY

An object of the present invention is to provide a method to prevent tar or asphalt from sticking to paving equipment, but without resorting to using solvents that may attack the asphalt. Another object of the present invention is to provide a method of utilizing water as a diluent, a cheap, plentiful diluent that also repels asphalt. It is another object of the present invention to provide a method to protect equipment from getting tar or asphalt stuck to them without resort to petroleum-based, natural-origin or chlorine-containing solvents.

These and other objects of the present invention have been attained by the present inventors' discovery of a method for preventing asphalt and tar from sticking to paving equipment, comprising contacting the surfaces with a dilution of a concentrated solution, preferably by spraying, rolling or brushing the diluted concentrate on the equipment prior to contacting the equipment with asphalt or tar; the concentrate comprising a fatty acid amide or mixture of fatty acid amides, a fatty acid neutralized with diethanolamine or another alkyl- or alkanolamine or amines, and an optional solvent or solvents.

The chief advantage of the instant invention is that the dilutions are viscous, and so prevent the diluted material from running off of the equipment or rapidly evaporating prior to contact with tar or asphalt. Another advantage of the instant invention is that even when the dilutions dry, they leave a lubricious film on the sprayed equipment.

DESCRIPTION OF THE INVENTION

This invention relates to a method of preventing tars, asphalts and related materials from sticking to paving equipment. The method comprises 1) coating a paving equipment surface by spraying, rolling or brushing with a release agent, 2) adding or contacting asphalt, tar or related material to the equipment or otherwise handling or using the asphalt, and 3) if transportation or movement of the asphalt or tar is the desired purpose of utilizing the paving equipment, separating the asphalt from the equipment by releasing it at its point of intended use or otherwise releasing the asphalt or tar or related material from the paving equipment.

More particularly, the invention relates to utilizing a water dilution of a concentrate comprising a fatty acid amide or mixture of fatty acid amides, a fatty acid neutralized with diethanolamine, and optionally a solvent or solvents, of a type(s) that does (do) not dissolve asphalt. Although concentrates not containing solvent will perform the same function, the addition of a solvent or solvents is a preferred embodiment, as the solvent or solvents tend to reduce the viscosity of the concentrate, and reduce it's freezing point, but do not dissolve asphalt.

There are many fatty acid amides on the market, sold to the detergent industry, for example. Examples of the fatty acid amides that find utility in the present invention are diethanolamides of caproic, enthanic, caprylic, capric, isodecyl, pelargonic, lauric, myristic, palmitic, oleic, linoleic, linolenic, stearic, isostearic, behenic, arachidic, arachidonic, erucic, azelaic, coconut, soya, tall oil, tallow, lard, neatsfoot, apricot, wheat germ, corn oil, cotton seed oil, ricinic, ricinoleic, rapeseed, palm kernel fatty acids, rosin acids, dimer acids, trimer acids, ozone acids, combinations and mixtures of these, as well as other fatty acids from natural or synthetic sources, with average carbon chain lengths from about 6 to about 60, the corresponding monoethanolamides, isopropanolamides, dimethylamides, and so on.

It is to be understood that there are other possible fatty acid amides that could find utility in this invention, the above list is representative, not exhaustive. In a preferred embodiment, the fatty amide is a mixture of amides of fatty acids of varying carbon chain lengths. In another preferred embodiment, the fatty acid amide is derived from coconut oil. In another preferred embodiment, the fatty acid amide is a mixture of amides, whose fatty acid portions are derived from 1) coconut oil and 2) either soy oil or other source high in oleic acid, or some other source of fatty acids, the average carbon chain length of which is longer than 12.

The useful range of the fatty acid amide portion of the concentrate is about 20 to about 90% by weight. In a preferred embodiment, the fatty acid amide portion of the concentrate is from about 50% to about 85% of the mixture.

Likewise, there are many fatty acids sold on the market. Examples of fatty acids that find utility in the present invention include caproic, enthanic, caprylic, capric, isodecyl, pelargonic, lauric, myristic, palmitic, oleic, linoleic, linolenic, stearic, isostearic, behenic, arachidic, arachidonic, erucic, azelaic, coconut, soya, tall oil, tallow, lard, neatsfoot, apricot, wheat germ, corn oil, cotton seed oil, ricinic, ricinoleic, rapeseed, palm kernel fatty acids, rosin acids, dimer acids, trimer acids, ozone acids, diacids, triacids, combinations and mixtures of these, as well as other fatty acids from natural or synthetic sources, the fatty portion of the acid having average carbon chain lengths from about 6 to about 60. It is to be understood that there are other possible fatty acids that could find utility in this invention, the above list is representative, not exhaustive.

In a preferred embodiment, the fatty acid is a mixture of fatty acids of varying carbon chain lengths. The fatty acid portion of the formulation should be from about 1% to about 20% by weight.

The fatty acid must be neutralized, preferably with an alkyl- or alkanolamine, such as monoethanolamine, diethanolamine, triethanolamine, methylamine, dimethylamine, trimethylamine, ethylamine, diethylamine, triethylamine, diethylethanolamine, propylamine, isopropylamine, dipropylamine, diisopropylamine, tripropylamine, triisopropylamine, or some other alkyl- or alkanolamine having from one to about 12 carbons, or ammonia, or mixtures and combinations of these. In a preferred embodiment the neutralizing amine is diethanolamine, monoethanolamine or diethylethanolamine. Typically, an excess of neutralizing amine is used on a molar basis compared to the fatty acid(s).

Solvents that find utility in the present invention include but are not limited to water, methanol, ethanol, propanol, isopropanol, butanol, isobutanol, tert-butanol, pentanol, isopentanol, neopentanol, hexanol, isohexanol, neohexanol, heptanol, octanol, isooctanol, 2-ethylhexanol, pine oil; a glycol or glycol ether, such as ethylene glycol, diethylene glycol, triethylene glycol, tetraethylene glycol, propylene glycol, dipropylene glycol, tripropylene glycol; a glycol ether of these glycols such as the methyl, ethyl, propyl, isopropyl, butyl, isobutyl, tertiarybutyl, pentyl, isopentyl, neopentyl, hexyl, 2-ethylhexyl ethers; a corresponding glycol alkyl ether acetate of a glycol such as those listed above or their propionates or isopropionates, butanoates; alkyl esters such as methyl acetate, ethyl acetate, propyl acetate, isopropyl acetate, butyl acetate, pentyl acetate, hexyl acetate, heptyl acetate, octyl acetate, 2-ethylhexyl acetate, nonyl acetate, decyl acetate, undecyl acetate, isodecyl acetate; or isomers, mixtures and/or combinations of these, and so on.

The major distinguishing characteristic of the preferred solvents are that they are poor solvents for asphalt, tar, etc., when diluted and used as per this invention. It is to be understood that small amounts of solvents that might otherwise dissolve asphalt can be tolerated when they are substantially a minority of the formulation, and it is well-diluted when used.

It is also to be understood that there are other possible solvents that could find utility in this invention, the above list is representative, not exhaustive. In a preferred embodiment, the solvent is isopropyl alcohol, pine oil, water, propylene glycol, propylene glycol methyl ether acetate, dipropylene glycol methyl ether acetate, propylene glycol methyl ether, dipropylene glycol methyl ether, or a mixture of two or more of these.

The solvent portion of the concentrate can be in the range of zero to 70 percent by weight, and the exact portion will depend on the particular combination of solvent or solvents and other components, the desired dilution rate, etc. However, in a preferred embodiment, the solvent comprises about 10 to about 50 percent of the mixture. In the most preferred embodiment, the solvent or solvents comprise between 10 and 20 percent of the mixture.

The dilutions that are useful range from about 1 part concentrate to 3 parts water, up to about one part concentrate to about 50 parts water. They are typically quite viscous, and can be sprayed, brushed or rolled on the paving equipment prior to being used.

In a preferred embodiment, the diluted mixtures are sprayed on utilizing a typical pump-up sprayer. In another preferred embodiment, the diluted mixtures are sprayed on under pressure, utilizing a spraying nozzle and electrically-driven or gasoline-engine-driven or diesel engine-driven pumping apparatus.

In another preferred embodiment, the diluted mixtures are sprayed on using a venturi-action chemical feeder attached to a hose with pressurized water flowing through. In another preferred embodiment, the concentrate is diluted using a venturi-action chemical feeder attached to an electrically-driven or gasoline-engine-driven or diesel engine-driven pumping apparatus, which utilizes the pressurized water flowing through the venturi action chemical feeder to draw concentrate into a mixing chamber, mix the concentrate and water, and then propel the diluted mixture out of a spray nozzle or nozzles.

In another preferred embodiment, the diluted mixtures are sprayed on using a venturi-action chemical feeder as above, and in addition to the water, pressurized air is forced into the diluted mixture to give a foamy, viscous spray, which is then sprayed onto the surface to be made into a release surface.

EXAMPLES

Examples 1 & 2 indicate that the present invention forms dilutions in the range of about 8/1 to about 30/1 with varying proportions.

Example 1

A mixture with the following composition was made:

| | |
|---|---|
| 1:1 coconut diethanolamide | 7466 g |
| Isopropanol | 933 g |
| Tall oil fatty acid | 933 g |
| Water | 5599 g |

Dilution of one part of this mixture with about 30 parts water forms a highly viscous solution that clings to vertical surfaces when sprayed on, and leaves an observable lubricious film when dried.

Example 2

A mixture with the following composition was made:

| | |
|---|---|
| coconut diethanolamide with approximately 6% (w/w) DEA | 56 g |
| coconut diethanolamide with approximately 24% (w/w) DEA | 24 g |
| Isopropanol | 10 g |
| Tall oil fatty acid | 20 g |
| Water | 90 g |

Dilution of one part of this mixture with about 7 parts water forms a highly viscous solution that clings to vertical surfaces when applied, and leaves an observable lubricating film when dried.

Examples 3 & 4 indicate that the formulations above form asphalt-repellent films when applied to paving equipment.

Example 3

A composition essentially similar to the one in example 2 was diluted one part with about eight parts water and sprayed onto asphalt truck beds at an asphalt plant. Trucks with relatively clean beds came back with shiny clean beds, and no buildup of asphalt on the truck beds was noted.

Example 4

A composition essentially similar to the one in example 1 was diluted with about 30 parts water to one part concentrate and sprayed onto asphalt truck beds at an asphalt plant. Trucks with relatively clean beds came back with shiny clean beds and no buildup of asphalt on the truck beds was noted. The plates where the pins holding the rear door of the dump trucks fit were essentially free from asphalt, whereas such surfaces that were not sprayed with the diluted composition were severely caked with hard asphalt that was difficult to remove.

This formulation was able to partially “slip under” previously-stuck asphalt and loosen it, giving an indication that the trucks could be “self cleaning” when using this material.

Example 5 indicates that other salts of fatty acids may be used to advantage.

Example 5

Tall Oil fatty acid was neutralized with the following alkyl amines: diethanolamine, monoethanolamine, diethylethanolamine or triethanolamine, and 0.2 g of each neutralized salt was added to 2.0 g of a coconut diethanolamide with about 6% (W/W) diethanolamine, and then the resultant mixtures were diluted to 100 g with water while stirring. In all cases, a viscous clear liquid was obtained.

Example 6

This example indicates that mixtures of sources of fatty acid amides, especially mixtures with coconut fatty acids and longer-chain length acids can give better performance than single-source fatty acid amide formulations.

Mixtures were made and then diluted slowly with water in stages while stirring, and the maximum apparent viscosities were compared.

The basic recipe is:

| | |
|---|---|
| 1:1 diethanolamide of coconut fatty acid | 0.8 g |
| Monoethanolamine salt of tall oil fatty acids | 0.8 g |
| amides 1), 2), 3) or 4) | 0.2 g |

The amides used were: 1) 1:1 diethanolamide of coconut fatty acids, 2) oleamide MIPA (monoisopropanolamide of oleic acid-rich mixture from natural sources), 3) stearic acid monoethanolamide, and 4) isostearic acid diethanolamide.

Solutions of formulations 2)–4) were noticeably more viscous at their maximum viscosities than solutions of formulation 1).

Example 7

This example indicates that different solvents can be used to advantage.

Mixtures of a 1:1 soyamide DEA (SA) or 1:1 cocoamide DEA (CA), tall oil fatty acid (TOFA), and solvent were made, and diluted with water. In all cases, viscous dilutions were obtained, but the formulations were relatively non-viscous and had good flow characteristics.

| AMIDE | g AMIDE | g TOFA | SOLVENT | g SOLVENT |
|---|---|---|---|---|
| SA | 340 | 2 | EXXATE 700 | 100 |
| CA | 250 | 20 | DPMA | 80 |
| SA | 320 | 20 | PINE OIL | 100 |
| CA | 40 | 5 | WATER | 10 |
| CA | 40 | 5 | PROPYLENE GLYCOL | 5 |

SOLVENTS: Exxate 700: alkyl acetate by the Exxon Chemical Company,

DPMA: dipropylene glycol methyl ether acetate by the ARCO Chemical Company, the others are self-explanatory.

What is claimed is:

1. A method for preventing asphalt and tar from sticking to paving equipment, comprising:

1) diluting a concentrate with about three to about 50 parts water to one part concentrate, 2) spraying, rolling or brushing the diluted concentrate on the equipment prior to its coming in contact with tar asphalt or related material, said concentrate comprising a fatty acid amide or mixture of fatty acid amides; a fatty acid or mixture of fatty acids, the fatty acid or acids having been neutralized with diethanolamine or another alkyl- or alkanolamine; and an optional solvent or combination of solvents, then 3) contacting the coated equipment with asphalt, tar or other related material, then 4) releasing the tar, asphalt or related material from the equipment, presumably at another location from the point of loading the equipment with tar or asphalt.

2. The method of claim 1 wherein the fatty acid portion of the fatty acid amide portion of the concentrate is derived from caproic, enthanic, caprylic, capric, isodecyl, pelargonic, lauric, myristic, palmitic, oleic, linoleic, linolenic, stearic, isostearic, behenic, arachidic, arachidonic, erucic, azelaic, coconut, soya, tall oil, tallow, lard, apricot, wheat germ, neatsfoot oil, corn oil, cotton seed oil, ricinic, ricinoleic, rapeseed, palm kernel fatty acids, rosin acids, dimer acids, trimer acids, ozone acids, combinations and mixtures, as well as other fatty acids from natural or synthetic sources, the fatty portion of the amide having carbon chain lengths from about 6 to about 60.

3. The method of claim 1 wherein the amide portion of the fatty acid amide portion of the concentrate is derived from diethanolamine, monoethanolamine, dimethylamine, isopropanolamine, some other alkyl- or alkanolamine, and/or mixtures or combinations of these.

4. The method of claim 1 wherein the fatty acid amide portion of the concentrate is a fatty acid amide or mixture of fatty acid amides, which together comprise from about 20 to about 90% of the mixture.

5. The method of claim 1 wherein the fatty acid amide portion of the concentrate is derived from coconut oil.

6. The method of claim 1 wherein the fatty acid amide portion of the concentrate is a mixture of amides, whose fatty acid portions are derived from a) coconut oil and b) soy oil or some other source high in oleic acid, or some other source of fatty acids, the average carbon chain length of which is longer than 12.

7. The method of claim 1 wherein the fatty acid portion of the concentrate is caproic, enthanic, caprylic, capric, isodecyl, pelargonic, lauric, myristic, palmitic, oleic, linoleic, linolenic, stearic, isostearic, behenic, arachidic, arachidonic, erucic, azelaic, coconut, soya, tall oil, tallow, lard, neatsfoot, apricot, wheat germ, corn oil, cotton seed oil, ricinic, ricinoleic, rapeseed, palm kernel fatty acids, rosin acids, dimer acids, trimer acids, ozone acids, diacids, triacids, combinations and mixtures of these, as well as other fatty acids from natural or synthetic sources, the fatty portion of the acid having carbon chain lengths from about 6 to about 60.

8. The method of claim 1 wherein the portion of the concentrate that is a fatty acid or combination of fatty acids is from about 1 to about 20 percent by weight.

9. The method of claim 1 wherein the neutralizing amine of the fatty acid amine salt portion of the concentrate is ammonia, monoethanolamine, diethanolamine, triethanolamine, methylamine, dimethylamine, trimethylamine, monoethylamine, diethylamine, triethylamine, diethylethanolamine, monopropylamine, monoisopropylamine, dipropylamine, diisopropylamine, tripropylamine, triisopropylamine, or some other alkyl- or alkanolamine having from one to about 12 carbons, or combinations and mixtures of these.

10. The method of claim 1 wherein the neutralizing amine of the fatty acid amine salt portion of the concentrate is used in a molar excess compared to the fatty acid portion of the concentrate.

11. The method of claim 1 wherein the solvent portion of the concentrate is water, an alcohol such as methanol, ethanol, propanol, isopropanol, butanol, isobutanol, tert-butanol, pentanol, isopentanol, neopentanol, hexanol, isohexanol, neohexanol, heptanol, octanol, isooctanol, 2-ethylhexanol, pine oil; a glycol or glycol ether, such as ethylene glycol, diethylene glycol, triethylene glycol, tetra-ethylene glycol, propylene glycol, dipropylene glycol, tripropylene glycol; a glycol ether of these glycols such as the methyl, ethyl, propyl, isopropyl, butyl, isobutyl, tertiarybutyl, pentyl, isopentyl, neopentyl, hexyl, 2-ethylhexyl ethers; a corresponding glycol alkyl ether acetate of a glycol such as those listed above or their propionates or isopropionates, butanoates; alkyl esters such as methyl acetate, ethyl acetate, propyl acetate, isopropyl acetate, butyl acetate, pentyl acetate, hexyl acetate, heptyl acetate, octyl acetate, 2-ethylhexyl acetate, nonyl acetate, decyl acetate, undecyl acetate, decyl acetate; or isomers, mixtures and/or combinations of these, wherein the solvent portion of the concentrate, either as a single solvent or in combination, ranges from about 0 to about 70 percent of the concentrate.

12. The method of claim 1 wherein the solvent portion of the concentrate, either as a single solvent or in combination, ranges from about 0 to about 20 percent of the concentrate.

13. The method of claim 1 wherein the concentrate is sprayed on to the release surface by means of a pumping action from a mechanically-driven pump or brushed or rolled on manually.

14. The method of claim 1 wherein the concentrate is sprayed on to the release surface by means of a pumping action from a manually-pumped-up sprayer, such as used to spray pesticides in a garden, roadsides, etc.

15. The method of claim 1 wherein the concentrate is sprayed on to the release surface by means of the pumping action from a hose hooked up to a water supply.

16. The method of claim 1 wherein the concentrate is mixed into the water used to dilute the concentrate manually prior to spraying it on the equipment to be sprayed with the mixture.

17. The method of claim 1 wherein the concentrate is mixed in with the water used to dilute it by means of a venturi action device.

18. The method of claim 1 wherein the concentrate is mixed in with the water used to dilute it by means of a venturi action device, and the diluted mixtures are sprayed on equipment using excess pressure from the water source, said water source being a hose with pressurized water flowing through.

19. The method of claim 1 wherein the concentrate is mixed in with the water used to dilute it by means of a venturi action device, and the diluted mixtures are sprayed on equipment using excess pressure from the water source, said water source being an electrically-, gasoline-engine-, diesel-engine- or some other type of engine-driven mechanical water pump.

20. The method of claim 1 wherein the concentrate is mixed in with the water used to dilute it by means of a venturi action device, and the diluted mixtures are sprayed on equipment using excess pressure from the water source, and pressurized air is mixed in with the diluted mixture to give a foamy viscous liquid, which is then sprayed onto equipment.

* * * * *